United States Patent
Alappat et al.

(10) Patent No.: US 7,340,538 B2
(45) Date of Patent: Mar. 4, 2008

(54) METHOD FOR DYNAMIC ASSIGNMENT OF SLOT-DEPENDENT STATIC PORT ADDRESSES

(75) Inventors: Kuriappan P. Alappat, Portland, OR (US); Chetan Hiremath, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 10/727,277

(22) Filed: Dec. 3, 2003

(65) Prior Publication Data

US 2005/0125575 A1 Jun. 9, 2005

(51) Int. Cl.
G06F 3/00 (2006.01)
G06F 5/00 (2006.01)

(52) U.S. Cl. .................. 710/5; 710/6; 710/41; 709/224; 709/226; 718/104

(58) Field of Classification Search ...................... 710/8
See application file for complete search history.

(56) References Cited

U.S. PATENT DOCUMENTS

| | | | |
|---|---|---|---|
| 5,526,489 A * | 6/1996 | Nilakantan et al. ......... | 709/228 |
| H001940 H * | 2/2001 | Lohn, III .................... | 370/216 |
| 6,438,625 B1 * | 8/2002 | Olson .......................... | 710/9 |
| 6,618,762 B2 * | 9/2003 | Fee et al. ................... | 709/245 |
| 6,898,702 B1 * | 5/2005 | Evans ........................ | 713/2 |
| 2002/0073249 A1 * | 6/2002 | French et al. ............... | 710/8 |
| 2003/0084219 A1 * | 5/2003 | Yao et al. .................. | 710/300 |
| 2004/0230866 A1 * | 11/2004 | Yates et al. ................ | 714/25 |
| 2004/0255000 A1 * | 12/2004 | Simionescu et al. ........ | 709/208 |
| 2005/0089027 A1 * | 4/2005 | Colton ....................... | 370/380 |
| 2006/0062160 A1 * | 3/2006 | Kim et al. .................. | 370/257 |
| 2006/0200539 A1 * | 9/2006 | Kappler et al. ............ | 709/220 |
| 2007/0022184 A1 * | 1/2007 | Sharma et al. ............. | 709/220 |

* cited by examiner

*Primary Examiner*—Donald Sparks
*Assistant Examiner*—Brooke J Dews
(74) *Attorney, Agent, or Firm*—Blakely, Sokoloff, Taylor & Zafman LLP

(57) ABSTRACT

A method for dynamic assignment of slot-dependent static network port addresses. Under the method, a slot address and shelf address are determined for a card modular platform board installed in a given slot in a shelf. The slot and shelf addresses are used as inputs to return a unique network address. The unique network address is then assigned as a static network address for the board's network port. The unique address may be provided by an address proxy, including a boot server. Firmware and/or software stored on a board may also be employed to obtain the static network address. The address may be obtained from a pre-configured lookup table, or dynamically determined using an algorithm.

15 Claims, 4 Drawing Sheets

METHOD FOR DYNAMIC ASSIGNMENT OF SLOT-DEPENDENT STATIC PORT ADDRESSES

FIELD OF THE INVENTION

The field of invention relates generally to modular platforms and, more specifically but not exclusively relates to a method for dynamically assigning slot-dependent static port addresses.

BACKGROUND INFORMATION

In a typical card modular platform, a plurality of boards are installed in a shelf having a backplane to which each board is communicatively coupled. For example, FIG. 1 shows a shelf 100 having an integrated subrack 102 including a plurality of slots into which respective boards 104 are installed. At the rear end of the integrated subrack 102 is a backplane 106. The backplane enables inter-board communication via a well-known communication scheme, such as Ethernet, Fibre Channel, PCI ExpressAS, etc. The communication links may also be TDM (Time Division Multiplexed) fabrics, such as Sonet/SDH or buses such as PCI. Under any of these schemes, each board is identified by a unique slot address.

In addition, boards may have common IP addresses in certain configurations. For example, if there is an active and standard by board, it is possible for a common IP address to follow the active board. In case of boards in multiple slots do the same function in a load sharing environment, it is possible to have a common IP address for all those boards where a switch implements load sharing using one of many load sharing algorithms. In that case, the traffic is routed through the appropriate ports to different slots.

One common approach is to employ Ethernet for inter-board communication, as illustrated in FIG. 2, which shows the internal configuration of a telecommunications (telco) switch 200. Switch 200 includes a dual star Ethernet fabric configured with a pair of switch fabrics 202A and 202B, each of which is coupled in communication to a plurality of boards 204A-G via a common backplane (not shown). The two switch fabrics 202A and 202B route traffic between any two boards, while the dual star configuration provides 1+1 redundancy. Switch fabrics 202A and 202B are also coupled in communication with a redundant external core switch 206, which provides an interface to an external network 208.

In general, telco equipment and the like need to provide 24-7 availability, thus the use of redundancy in the switch fabric and external core switch. At the same time, each slot within a given shelf will be configured for a particular function. Once configured, the configuration remains the same unless a major event warrants reconfiguration. Redundant boards may be used to provide non-stop service. In case of a failure, automatic fail-over to the standby board takes place and the failed board is eventually replaced. This sequence ensures that the operation is not interrupted.

Among the configuration operations is the assignment of an IP address for each of a board's Ethernet ports. In a typical installation, each slot within a shelf may be configured for a particular function, with the possibility of multiple slots used to perform the same function in a load sharing manner. It is possible that boards in certain slots are loaded with pre-configured set of software, including operating systems, drivers, applications, configuration settings, etc. Furthermore, at least a portion of the boards, such as the system manager board/s, is aware of the functions served by the other boards. Accordingly, it is advantageous to assign an IP address for a replacement board that matches the IP address of the board being replaced. Under this consideration, each board is assigned a static IP address, as illustrated by IP addresses 210, as illustrated in FIG. 2. Also it is advantageous to load software images dependent on slot address since as described earlier each slot is pre-assigned a particular function. This allows for ease of deployment in a modular platform environment by avoiding manual intervention, potential human errors and saving time.

There are several conventional methods for assigning static IP addresses. On method is to manually configure the board with a pre-assigned address. This is time consuming and error prone. It also requires the board to be up and running prior to assigning an address. Another scheme is to employ a DHCP (Dynamic Host Configuration Protocol) server, which is normally used to dynamically assign addresses. However, in this instance, it is desired to assign the new replacement board a pre-determined address. DHCP supports this option via an address reservation mechanism. The mechanism works by knowing the MAC (media access channel) address of the board's network port. The MAC address is entered into a DHCP console or the like, along with the pre-assigned address. When the board is installed, a DHCP message exchange occurs during which the board identifies its MAC address and the DHCP server issues the corresponding pre-assigned address. In a somewhat similar manner, IP addresses may be assigned by an Ethernet switch.

While the foregoing DHCP scheme works for assigning static IP addresses, it has its limitations. For example, a critical requirement for all networks is each node must have a unique network address. Most, if not all, DHCP server configuration schemes do not let the same IP address be reserved for more than one MAC address, and thus one board. As a result, it is not possible to configure IP addresses for replacement boards in advance using a conventional DHCP reservation. It is also more complex to access the DHCP server configuration and make changes as the access to it is limited and could consume more time. Besides, the administrator who replaces the board may not have access privileges to make changes to network configurations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and apparatus for dynamic assignment of slot-dependent static port addresses and software images are described herein. In the following description, numerous specific details are set forth, such as embodiments in which IP network addresses are assigned, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of this specification, techniques are disclosed for automatically assigning static IP addresses based on the shelf and slot addresses of respective boards in a given card modular equipment where the equipment could be a single shelf or multiple shelves in a rack. In case of multiple shelves, each slot in each shelf will have a unique slot address. Under the technique, a board does not depend on either a DHCP server, fabric board, or manual intervention for the assignment of an static network port IP address (or addresses for a multi-port board). Rather, a static network address is assigned in a manner that is independent of the MAC address of the board, eliminating the overhead and errors associated with the prior art schemes.

Figure 1:
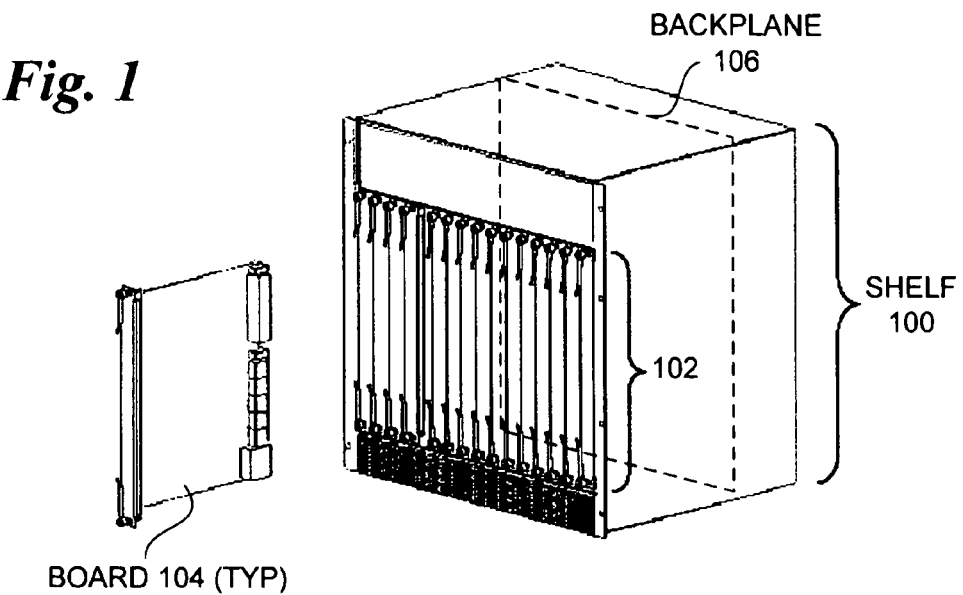
FIG. 1 is a schematic diagram illustrating a typical configuration for a card modular platform including a plurality of boards inserted into respective slots in an integrated sub-rack in a shelf.
Figure 2:
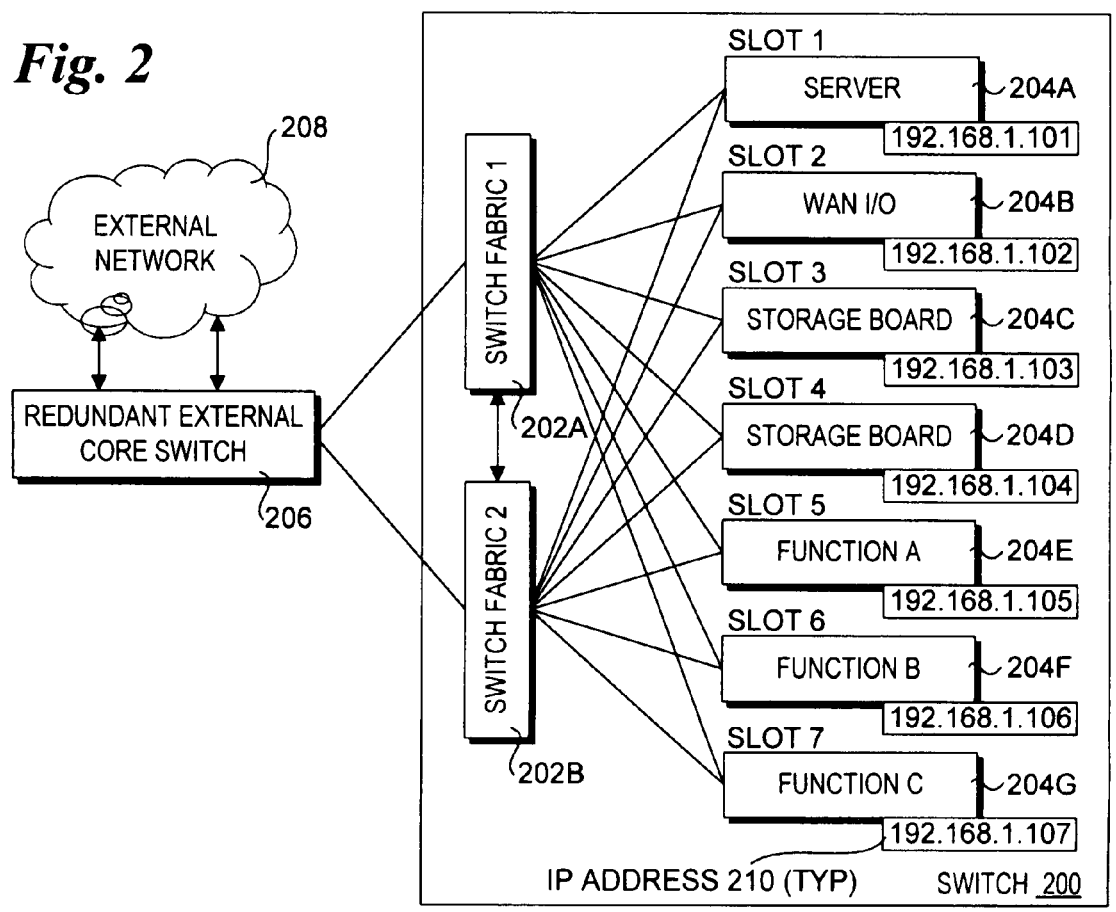
FIG. 2 is a schematic diagram illustrating various components and intercommunication paths between various boards in a telecommunications shelf configured as a card modular platform.
Figure 3:
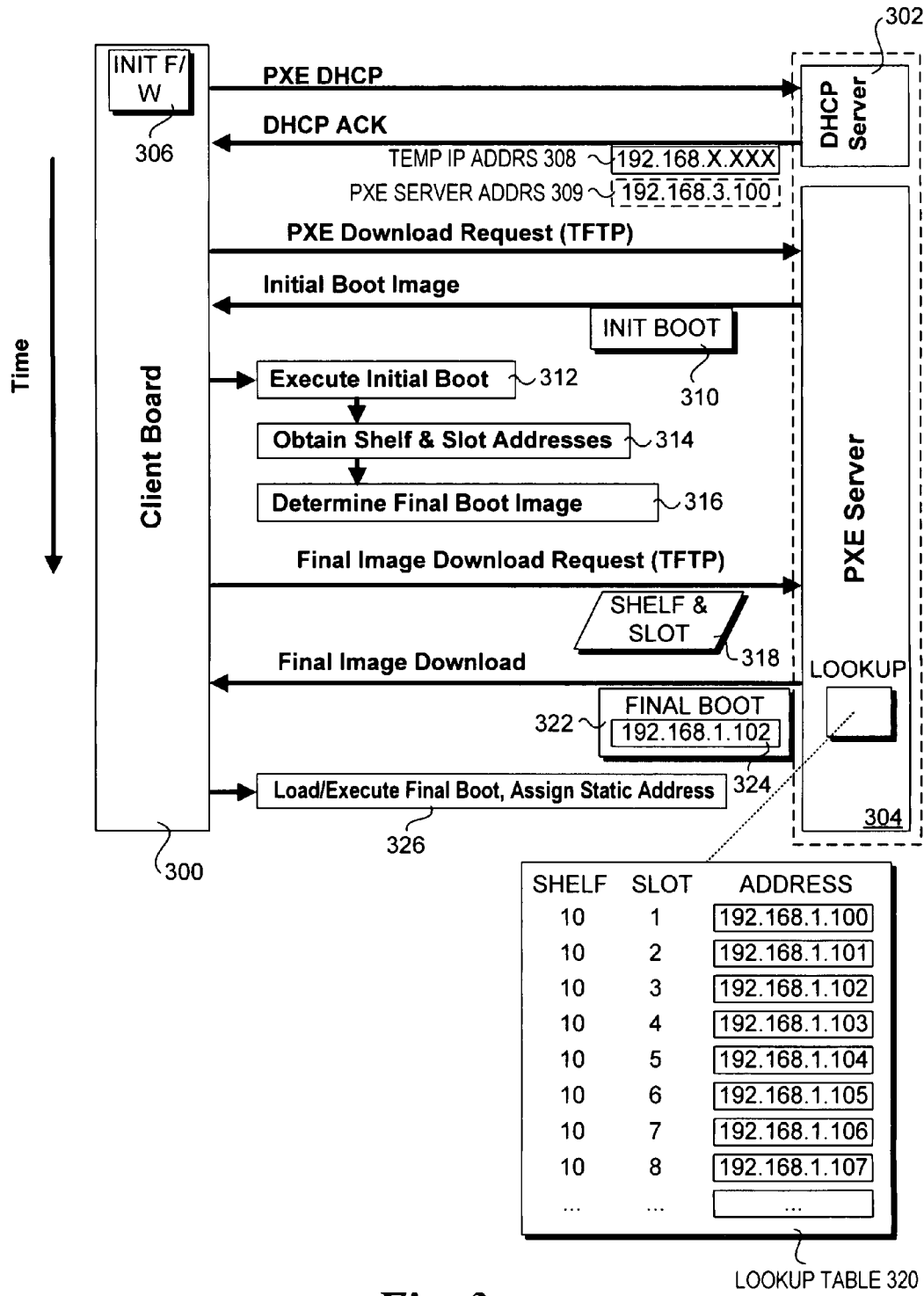
FIG. 3 is a flow diagram illustrating interactions between and operations performed by a client board, a DHCP server, and a PXE server during a static network address assignment process, according to one embodiment.

An exemplary technique for obtaining static network port addresses in accordance with one embodiment is depicted in FIG. 3. The technique involves a series of message exchanges between a client board 300, a DHCP server 302, and a PXE (pre-boot execution environment) server 304. In one embodiment, the DHCP server and PXE server are co-located on the same machine. The series of message exchanges illustrated in FIG. 3 correspond to operations that are performed in response to a board start-up event.

First, a small portion of firmware 306 is executed on client board 300 to perform early initialization of the board, including enabling basic network communications. For example, to support Ethernet networks, a network interface that supports Ethernet is initialized.

The next set of operations involves an exchange of messages between client board 300 and DHCP server 302 to obtain a temporary IP address. For simplicity, this message exchange is depicted as a DHCP IP address request and a DHCP acknowledge. In practice, the series of communications exchanges comprises the following:

1. The client board broadcasts a DHCP_Discover message on its local sub-net searching for DHCP server; the request may go over subnet boundaries if the switches are set up to relay the requests
2. A listening DHCP server sends a DHCP_Offer message containing an offered IP address to the client board;
3. The client board accepts the offered IP address and broadcasts a DHCP_Request message on the local sub-net containing the accepted IP address; and
4. The DHCP server responds via a unicast to the client board with a DHCP_Ack message to acknowledge the IP address has been accepted.

The foregoing illustrates a sequence under which a single DHCP server receives the DHCP_Discover message. Under some circumstances, multiple DHCP servers may receive the DHCP_Discover message, and offer respective IP addresses in response. Under this circumstance, the client board will select one of the offered IP addresses. The net result is that the client board will end up with a temporary IP address 308. The particular address is not important, and will generally relate to the IP address scope allotted to the DHCP server by an administrator. At this point, the client board 300 can communicate with other network entities via unicasts rather than broadcasts.

The remaining message exchanges are between the client board 300 and the PXE server 304 (or a co-located DHCP/PXE server). In general, a PXE server is used to provide bootable operating system (OS) images to network clients, thus removing the requirement of the client needing to store a local OS image and applications on local hard disk drives (HDDs) or flash ROMs (read-only memories. Even if images and applications are stored locally in flash memory or on a local HDD, the same technique may be used to update the OS and image. In addition to this function, PXE server 304 also serves the function of a network address proxy. That is, the PXE server is configured to allocate network address in lieu of a conventional address allocated, such as a DHCP server or a domain controller.

In order to exchange messages with PXE server 304, client board 300 needs to know the PXE server's network address, and a transmission protocol needs to be established. In one embodiment, if the DHCP and PXE servers reside on the same machine, the response to the DHCP request above will contain information needed by the client to start a TFTP (Trivial File Transfer Protocol) session. TFTP is a simplified transmission protocol that does not require the overhead of more robust protocols, such as the TCP/IP protocol used for most network traffic. If the DHCP and PXE servers are hosted by separate machines (necessitating separate network addresses) and the DHCP server is configured to know the IP address of PXE server 304, the PXE server's address will be included in the DHCP message exchange, such as depicted by a PXE server address 309. The client board 300 will then contact PXE server 304 via PXE server address 309 to obtain information for starting a TFTP session. If the DHCP server does not have address information for the PXE server, the client may broadcast a PXE discover message akin to the DHCP discover message discussed above to locate the PXE server. Upon receiving the PXE discover message, the PXE server will respond with information for starting a TFTP session, including it's network address.

The series of message exchanges between client board 300 and PXE server 304 begins with a PXE download request message sent from the client board to the PXE server via TFTP. In response to receiving the request, the PXE server 304 returns an initial boot image 310 via TFTP to the client board.

Upon receiving the initial boot image 310, the image is executed by the client board, as depicted by a block 312. In general, the initial boot image comprises a generic or common boot image that is applicable for initializing various different types of client boards and is independent of a board's slot number. Included in the initial boot image (or otherwise already stored on the client board) are instructions to enable the client board to obtain its shelf and slot addresses in a block 314. This operation may be performed in one of several manners, depending on the particular board type and/or configuration.

For example, in one embodiment client board 300 is configured as a PICMG 3.0 (PCI (peripheral component interface) Industrial Computers Manufacturing Group)-compliant board. Accordingly, client board 300 sends IPMI (Intelligent Platform Management Interface) commands GetAddressInfo and GetShelfAddressInfo over a KCS (Keyboard Controller Style, an IPMI messaging protocol) interface to obtain the slot and shelf addresses, respectively. If a KCS interface is not implemented, similar information may be retrieved through another type of interface, such as a propriety interface.

In further detail, a GetAddressInfo command is sent by the initial boot image on the client board to its own IPMC (IPMI Controller). The IPMC's response contains several fields including one called "Site ID" which is the same as the board's slot number. The response also contains its IPMB (Intelligent Peripheral Management Bus) address, which is used in the "Send Message" command described below. The request and response data are described in Table 3-8, of the PICMG 3.0 specification.

Next, a GetShelfAddressInfo command (as per Table 3-12, PICMG 3.0) is sent by the initial boot image to the Shelf Manager (at 20 h IPMB address) using the "Send Message" command format described in Table 18-9, IPMI V1.5 Specification. The initial boot image on the client board then sends a GetShelfAddressInfo command to its IPMC to fetch response data. The response contains the Shelf Address field.

In another embodiment, client board 300 is configured in accordance with the CompactPCI standard. In this case, the board's OEM (original equipment manufacturer) may define OEM-specific IPMI commands to determine the slot and shelf address to uniquely identify the board in a given facility.

In a block 316, a final boot image is determined for the client board. Unlike the generic initial boot image 310, the final boot image will typically pertain to a particular board configuration or type. In one embodiment, a set of available final boot images is provided to the client board in the initial boot image 310. After the final boot image has been determined, a download request for the same is sent via TFTP from the client board to PXE server 304. The TFTP request also includes slot and shelf address data 318.

In response to receiving the final boot image download request, PXE server 304 retrieves a corresponding image and returns it to client board 300. At the same time, the PXE server determines an IP address (or multiple addresses in the case of multi-port boards) to allocate client board 300 based on shelf and slot data 318. In one embodiment, a pre-configured lookup table 320 is stored by PXE server 304, or otherwise made available for access to the PXE server. For example, in the latter instance a central configuration server may store an IP address lookup table for an entire system that uses multiple PXE servers.

An exemplary configuration for lookup table 320 is shown in FIG. 3. The illustrated configuration includes a shelf column, a slot column, and an address column. The address to be assigned is determined based on the row containing shelf and slot values corresponding to shelf and slot data 318.

In one embodiment, a final boot image 322 is returned to the client board 300, along with an embedded or attached assigned IP address 324. In another embodiment, the final boot image and assigned IP address are sent as separate TFTP payloads.

The address configuration process is completed in a block 326, wherein the final boot image 322 is loaded and/or executed, and a static IP address corresponding to assigned IP address 324 is assigned by the operating system of client board 300. Henceforth, other system components, such as boards 204A-G, will be able to communicate with the new board via the assigned IP address 324.

Figure 4:
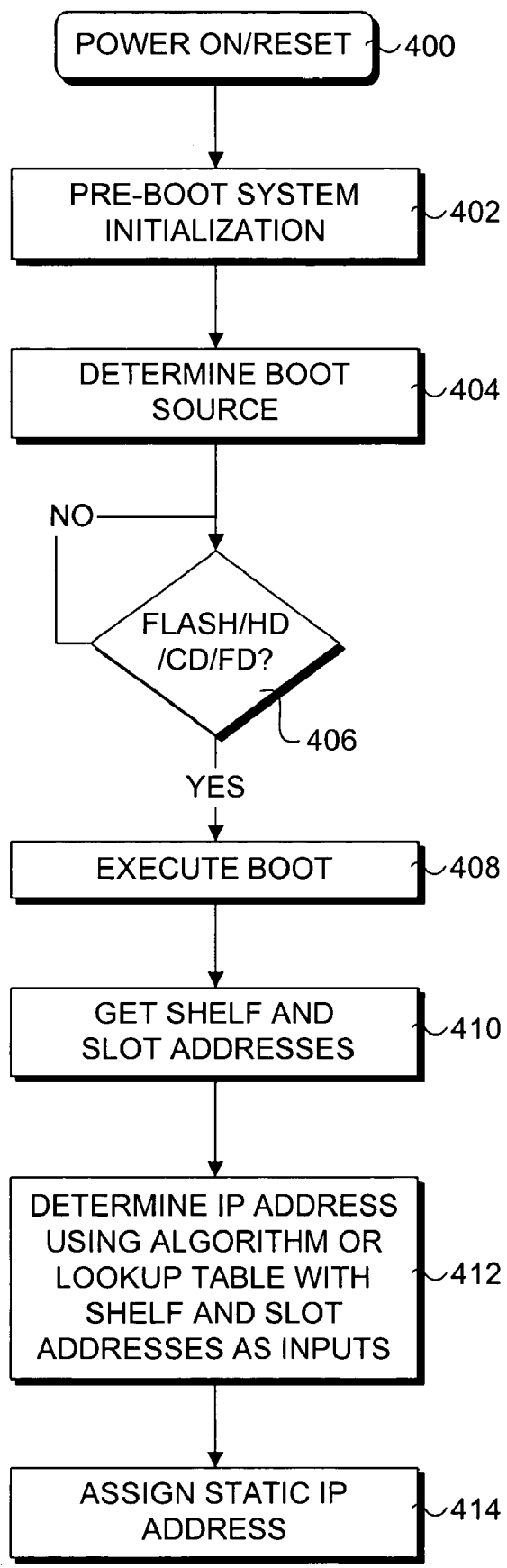
FIG. 4 is a flowchart illustrating operations performed via execution of instructions on a card modular platform board to obtain a static network address for the board.

FIG. 4 illustrates operations performed during an embodiment of a static network address allocation scheme that is applicable for boards that boot an operating system stored on a local device. The process begins with a start block 400 corresponding to a power-on or reset event. For example, inserting a new board into a slot would result in a power-on event. In response, a series of pre-boot system initialization operations are performed in a block 402. This generally encompasses the loading and execution of firmware to set up the board for booting an operating system. For example, in response to a power-on event, this will typically include performing a Power-On Self Test (POST), as well as memory initialization. For reset events, the POST operations are usually skipped.

Next, determination of the boot source is performed, as depicted by a block 404 and decision block 406. For example, a bootable image may be loaded from a flash device, a hard disk (HD), a CD-ROM, a floppy disk (FD), etc. Once the boot source is determined, the bootable OS image is booted (i.e., loaded and/or executed) in a block 408.

The remaining operations in blocks 410, 412, and 414 relate to obtaining a static network address. In one embodiment, the bootable OS image includes instructions for performing these operations. In another embodiment, firmware stored on the client board includes instructions for performing the operations. In yet another embodiment, the instructions are provided via a combination of firmware and the operating system image.

In block 410 the shelf and slot addresses are obtained. This process is similar to that discussed above for the PXE Server embodiment. For example, GetAddressInfo and GetShelfAddressInfo IPMI commands may be employed for PICMG-compliant boards, or OEM IPMI commands may be used for configurations such as CompactPCI-based platforms.

Next, in block 412, an IP address is determined using the shelf and slot addresses as inputs. In one embodiment, an algorithm is employed to generate the addresses. For installations in which local booting is used system-wide, a single algorithm may be employed to guarantee unique IP address assignment. For example, the shelf address may be used to generate an IP sub-mask, while the slot address may be used to generate the non-masked portion of the IP address. In another embodiment, an IP address lookup table similar to lookup table 320 may be used. In general, a copy of the IP address lookup table may be stored on the client board, locally accessible to the client board (e.g., stored in a component accessible to all boards within a common shelf), or accessible via a network connection. In this latter case, means for accessing the network will be enabled prior to retrieving the lookup table.

The process is completed in a block 414, wherein the network address determined in block 412 is assigned as a static IP address by the operating system. This operation can be performed using well-known techniques particular to a given operating system; accordingly, further details are not provided herein.

The foregoing schemes provide several advantages over known network address allocation schemes. It enables field-replaceable units to readily identify itself in highly dense modular server environments. The network address of a failed board and its replacement are the same, enabling the replacement process to appear completely transparent to other system components. There is no manual configuration required, nor is there any special programming that needs to be made at a DHCP server or Ethernet switch. The scheme is easily scalable, with lookup tables being support both at a local PXE server and centralized server levels.

Figure 5:
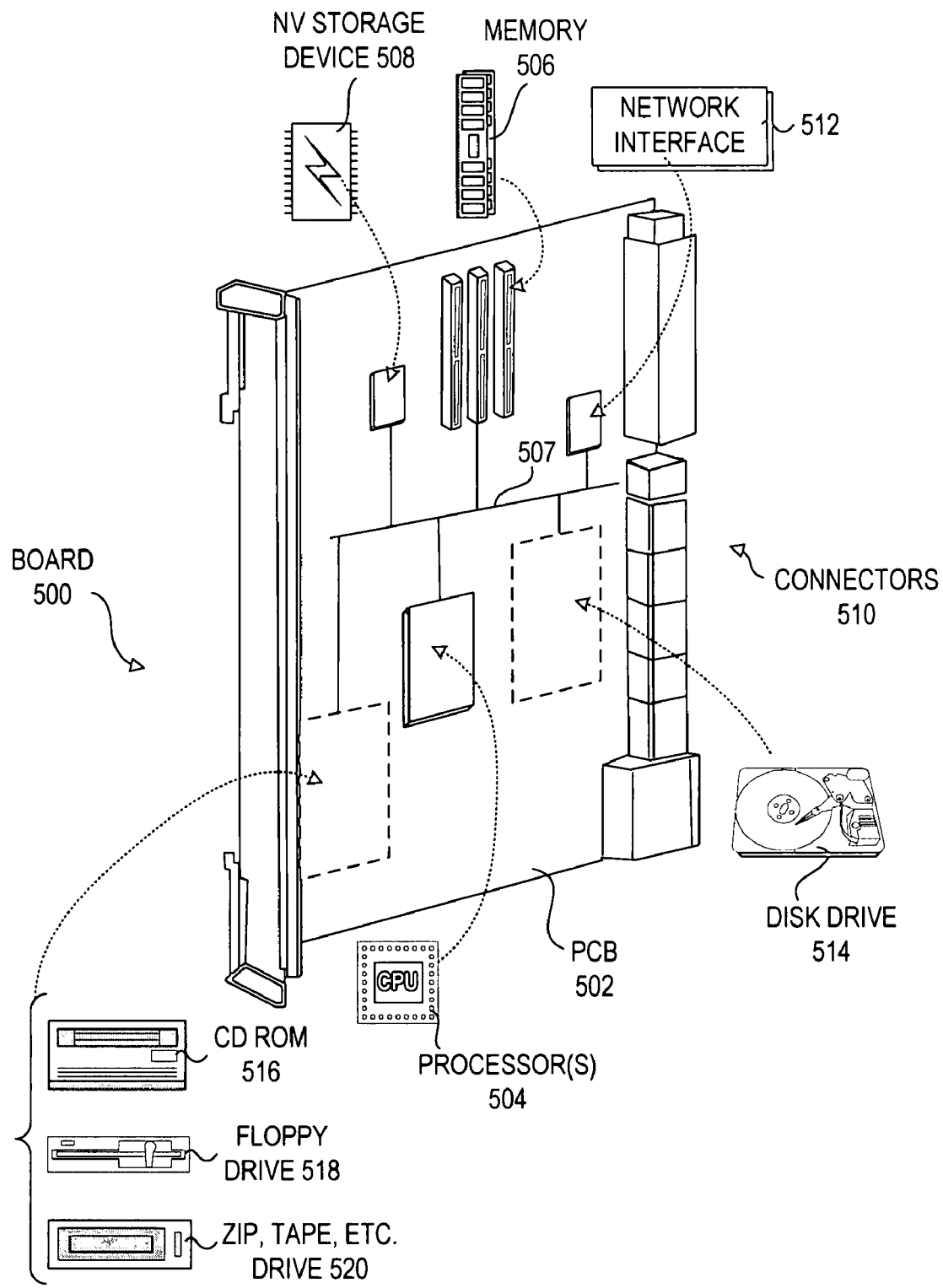
FIG. 5 is a schematic diagram illustrating various components of an exemplary card modular platform board that may be used to practice embodiments of the invention disclosed herein.

FIG. 5 shows a board 500 suitable for practicing client-side and stand-alone aspects of the embodiments disclosed herein. Board 500 includes a printed circuit board (PCB) 502 on which various components are operatively coupled, including one or more processors 504, and memory 506. Memory 506 may include, but not limited to, Dynamic Random Access Memory (DRAM), Static Random Access Memory (SRAM), Synchronized Dynamic Random Access Memory (SDRAM), Rambus Dynamic Random Access Memory (RDRAM), or the like. For the purpose of clarity, details of various well-known circuit elements, such as power planes, busses, and the like are not shown on PCB 502; it will be understood that such circuit elements would be present in an actual board. Likewise, various integrated circuit and passive circuit elements (e.g., resistors, capacitors, inductors, etc.) are also not shown for clarity. For purpose of illustration, the various components depicted in FIG. 5 are linked in communication via a bus 507, which will be understood to represent various types of busses that may be provided by PCB 502, including but not limited to parallel, serial, PCI, compactPCI, etc.

Firmware for the board and/or persistent data will typically be stored on some type of non-volatile storage device 508. Non-volatile storage devices include, but are not limited to, Read-Only Memory (ROM), Flash memory, Erasable Programmable Read Only Memory (EPROM), Electronically Erasable Programmable Read Only Memory (EEPROM), or the like memory. In cases where OS and image sizes are large, for example, IA (Intel Architecture) single board computers (SBCs), the images are stored in volatile memory such as DRAM. In this case, the image is loaded into the volatile memory every time power is cycled.

Each board will include a set of connectors 510 that are used to couple the board to a common backplane or the like. In general, the set of connectors 510 will be compatible with the backboard standard or configuration employed for the platform, and are used to provide inter-board communication paths via the backplane, as well as communication paths to external network entities. The backplane (not shown) will typically provide power to each board (e.g., −48 volts for telco boards), although a power converter such as a DC-DC converter may be provided by a board to ensure appropriate voltage and current levels are available for the various components mounted to PCB 502. A network interface 512 will be provided to facilitate network communication, such as but not limited to an Ethernet network interface controller.

Some boards may provide various types of mass storage, including a hard disk drive 514. Optional mass storage devices that may also be provided include removable machine-readable media peripherals, such as a CD-ROM drive 516, floppy drive 518, Zip drive, tape drive 520, etc.

The machine-executable instructions for performing the various board operations discussed above will generally be embodied as firmware and/or software instructions that are executed on processor(s) 504. The firmware and/or software instructions will typically be provided via a machine-readable medium. For the purposes of this specification, a machine-readable medium includes any mechanism that provides (i.e., stores and/or transmits) information in a form readable or accessible by a machine (e.g., one or more processors 504). For example, a machine-readable medium includes, but is not limited to, recordable/non-recordable media (e.g., a read only memory (ROM), a random access memory (RAM), a magnetic disk storage media, an optical storage media, a flash memory device, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

determining a shelf address and a slot address of a board installed in a card modular platform, wherein the shelf address corresponds to a physical shelf of the card modular platform and the slot address corresponds to a physical slot location on the shelf of the card modular platform; and automatically assigning a static network Internet Protocol ("IP") address for at least one network port on the board based on a combination of the shelf address and the slot address, wherein the static network IP address is automatically assigned by performing operations including:

configuring an address proxy server with an address lookup table containing a unique network address for each shelf address and slot address combination;

sending the shelf and slot addresses from the board to the address proxy server;

querying the address lookup table based on the shelf and slot addresses to retrieve a corresponding network address; and returning the network address to the board.

2. The method of claim 1, wherein the shelf and the slot addresses are respectively obtained by issuing GetAddressInfo and GetShelfAddressInfo IPMI (Intelligent Platform Management Interface) commands.

3. The method of claim 1, wherein the board is made by an original equipment manufacturer (OEM) and the shelf and the slot addresses are obtained by employing OEM-specific IPMI (intelligent Platform Management Interface) commands.

4. A method comprising:

obtaining, for a network port on a board installed in a card module platform, a temporary IP (Internet Protocol) address from a DHCP (Dynamic Host Configuration Protocol) server;

receiving an initial boot image from the boot server;

determining a shelf address and a slot address of the board installed in the card module platform by executing instructions in the initial boot image;
sending the shelf and slot addresses to a boot server;
receiving a final boot image along with an IP address from the boot server;
executing the final boot image; and
setting a static IP address for the board in accordance with the IP address that was received from the boot server with the final boot image.

5. The method of claim 4, wherein the boot server comprises a PXE (pre-boot execution environment) server.

6. The method of claim 4, further comprising:
executing firmware on the board to initialize a network interface; and
performing a DHCP message exchange via the network interface to obtain the temporary address.

7. The method of claim 4, further comprising returning an IP address for the boot server in addition to the temporary IP address.

8. The method of claim 4, further comprising:
configuring the boot server with an IP address lookup table containing a unique network address for respective shelf address and slot address combinations; and
querying the IP address lookup table based on the shelf and slot addresses to retrieve the IP address to be assigned as the static IP address.

9. The method of claim 4, wherein data exchanged between the board and the boot server is sent via the Trivial File Transfer Protocol (TFTP).

10. The method of claim 4, further comprising co-locating the DHCP server and the boot server on the same machine.

11. A card modular platform board, comprising:
a printed circuit board (PCB) on which a plurality of components are operatively coupled and linked in communication via circuitry on the PCB, including,
a processor;
memory;
at least one backplane connector, configured to couple to a backplane installed in a card modular platform shelf having a plurality of slots;
a network interface coupled to a network port; and
at least one of a non-volatile storage device or a mass storage device; and
machine executable instructions stored in said at least one of the non-volatile storage device or the mass storage device, which when executed by the processor perform operations in response to insertion of the board into a slot, comprising:
initializing the network interface;
performing client-side operations in a DHCP (Dynamic Host Configuration Protocol) message exchange to obtain a temporary IP (Internet Protocol) address from a DHCP server;
receiving an initial boot image from a boot server;
executing instructions in the initial boot image to obtain the shelf and slot addresses;
receiving a final boot image along with a static IP address from the boot server; and
booting the final boot image,
wherein the static IP address that was received from the boot server is assigned by the final boot image as the static IP address for the network port,
wherein the static IP address is assigned dependent upon the shelf and slot addresses and independent of a media access control ("MAC") address of the PCB.

12. A tangible machine-readable medium to provide instructions, which when executed by a card modular platform board performs operations in response to insertion of the board into a slot of a card modular platform shelf, including:
receiving an initial boot image from a boot server;
executing instructions in the initial boot image to obtain shelf and slot addresses of the board;
receiving a final boot image;
booting the final boot image; and
automatically assigning a static Internet Protocol ("IP") address for the network port by the final boot image based on the shelf address and the slot address.

13. The tangible machine-readable medium of claim 12, wherein the static IP address is determined by performing an algorithm that generates a unique address in response to providing the shelf and slot addresses as inputs to the algorithm.

14. The tangible machine-readable medium of claim 12, wherein the medium comprises a firmware storage device, and the instructions comprise firmware.

15. The tangible machine-readable medium of claim 12, wherein the shelf and the slot addresses are respectively obtained by issuing GetAddressInfo and GetShelfAddressInfo IPMI (Intelligent Platform Management Interface) commands via execution of the instructions.

* * * * *